United States Patent [19]

Tiliakos

[11] 4,313,708
[45] Feb. 2, 1982

[54] PORTABLE LIFTING AND DELIVERING APPARATUS FOR BIN CONTAINERS

[76] Inventor: Mike J. Tiliakos, 291 Twelfth St., Campbell, Ohio 44405

[21] Appl. No.: 159,302

[22] Filed: Jun. 13, 1980

[51] Int. Cl.³ .................................................. B60P 1/54
[52] U.S. Cl. ...................................... 414/498; 254/47; 414/919
[58] Field of Search ...................... 414/332, 498, 919; 254/45, 47, 48

[56] References Cited

U.S. PATENT DOCUMENTS

| 2,670,866 | 3/1954 | Glesby | 414/498 X |
| 2,678,737 | 5/1954 | Mangrum | 414/498 X |
| 2,937,879 | 5/1960 | Lion | 414/498 X |
| 3,139,266 | 6/1964 | Tew | 254/47 |
| 3,891,108 | 6/1975 | Traficant | 254/45 |
| 4,053,073 | 10/1977 | Franchin | 414/498 |

FOREIGN PATENT DOCUMENTS 816595 10/1951 Fed. Rep. of Germany ...... 414/498

Primary Examiner—Robert G. Sheridan
Attorney, Agent, or Firm—Harpman & Harpman

[57] ABSTRACT

A lifting and delivering apparatus for bin containers for holding granular material such as used in sand blasting. The apparatus uses a cable and post lifting and support system to provide a stable elevated bin container suitable for use as a detachable truck body in a self-contained construction.

4 Claims, 4 Drawing Figures

PORTABLE LIFTING AND DELIVERING APPARATUS FOR BIN CONTAINERS

BACKGROUND OF THE INVENTION (1) Field of the Invention:

This invention relates to portable bin containers for bulk materials such as are used in sandblasting.

(2) Description of the Prior Art:

Prior art devices have used a number of different devices for provide a bin container for use at a job site. See for example U.S. Pat. Nos. 2,670,866; 2,678,737 and 4,053,073.

In U.S. Pat. No. 2,670,866, a transportation means is shown wherein a truck body is elevated by hydraulics to load and unload bins having fixed support legs.

U.S. Pat. No. 2,678,737 discloses a bin supported on a truck bed. The bin is raised by a jacking means so that the legs can be extended from the bin to hold the same.

In U.S. Pat. No. 4,053,073 a leveling and lifting system for truck bodies is shown wherein hydraulic cylinders are positioned on the corners of the truck body. In use the cylinders engage the ground lifting the body from the truck bed.

Applicant's device uses a post and cable combination having one power and drive source that lifts the bins from the truck which are stabilized and locked in place by a pair of secondary support braces.

SUMMARY OF THE INVENTION

A self-contained delivery and lifting apparatus for portable bins of the type used in supplying sandblasting abrasives. The device uses a cable and post combination to lift a detachable bin from a truck body. A single drive source is used to engage the posts with the ground and elevate the bins to the required height so the truck can be driven away. Scissorlike supports expand as the bins are lifted and lock into place for added stability and safety.

DESCRIPTION OF THE PREFERRED EMBODIMENT

Figure 1:
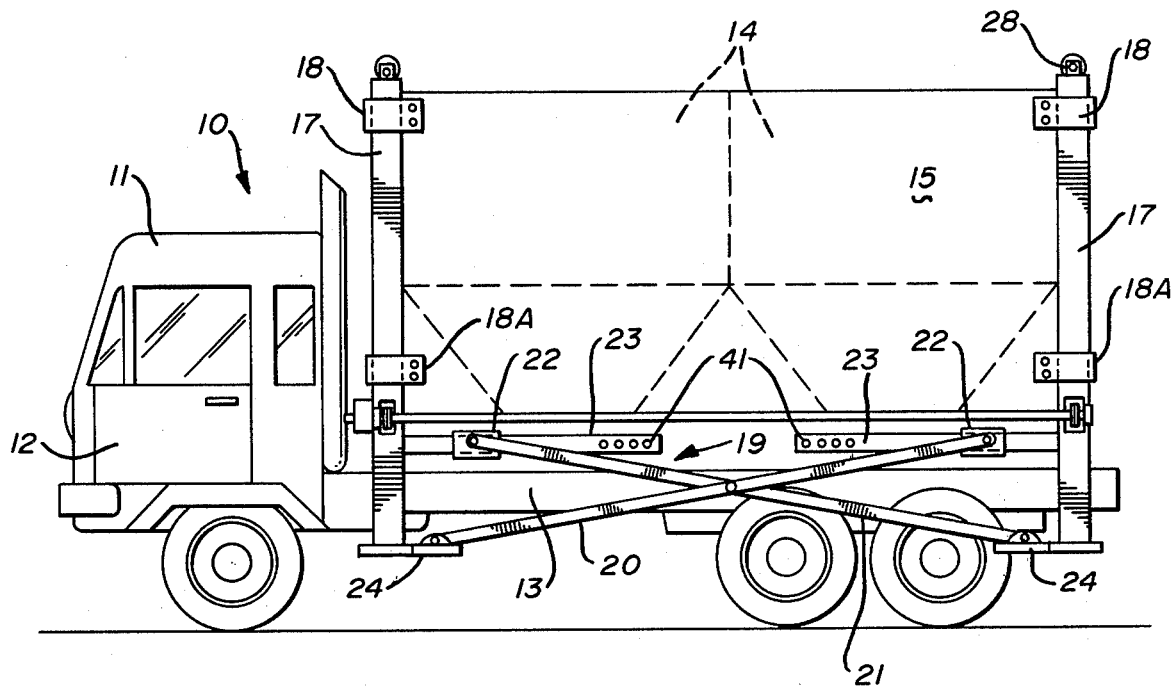
FIG. 1 is a side elevational view of the lifting apparatus and transport truck.
Figure 3:
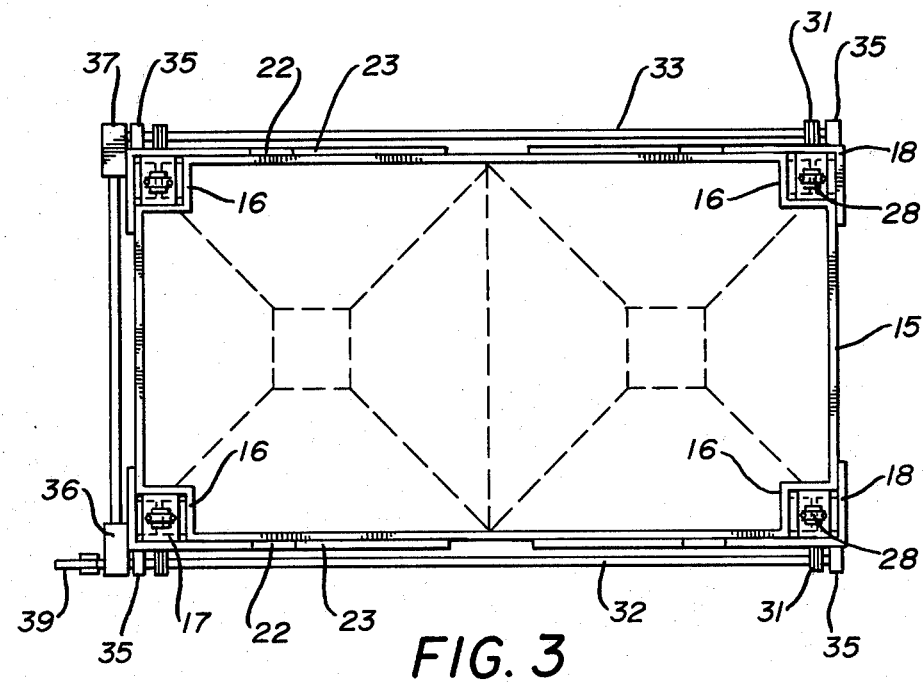
FIG. 3 is a top plan view of the bin and lifting apparatus.
Figure 2:
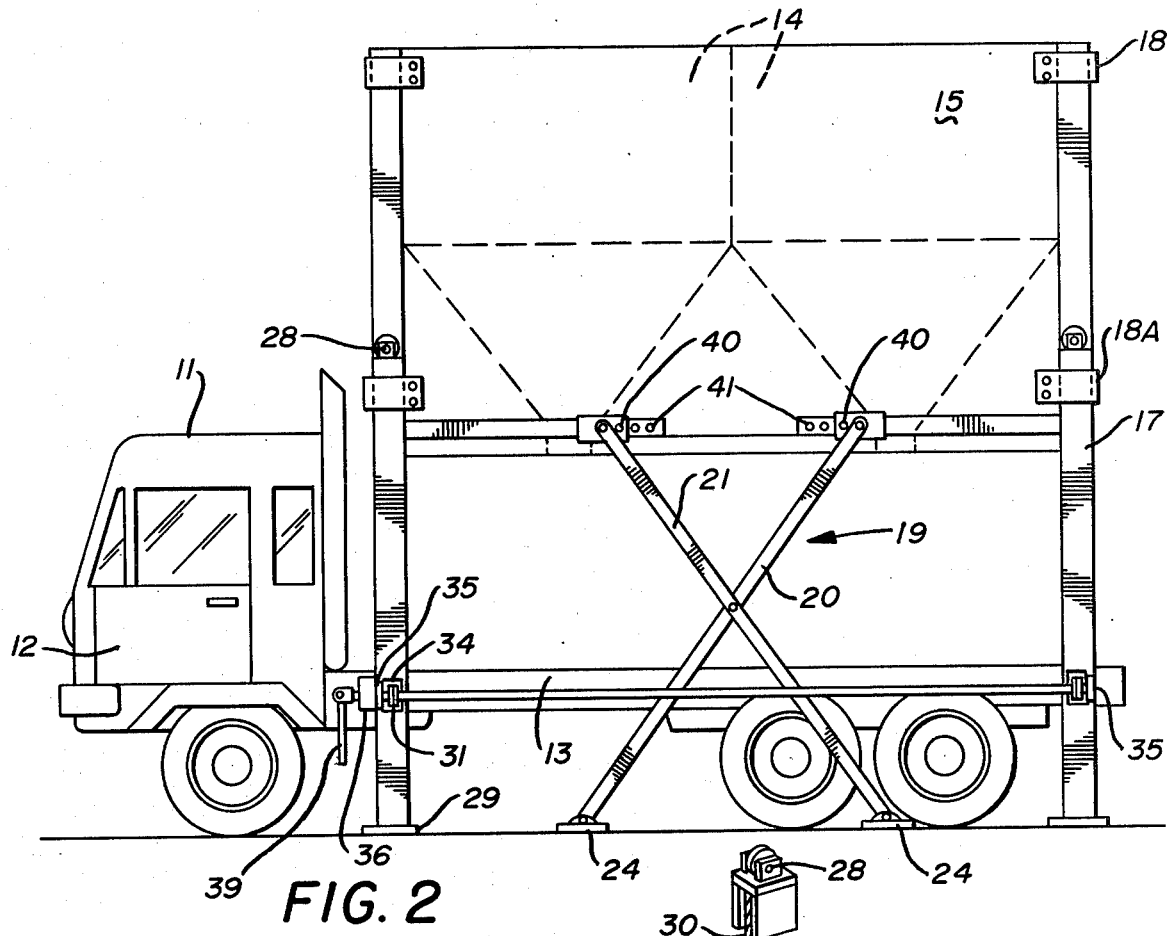
FIG. 2 is a side elevational view of the lifting apparatus in extended position.

A delivery and lifting apparatus for bin containers for use in the sandblasting industry comprises a truck and bin assembly generally indicated at 10 in FIGS. 1 and 2 of the drawings. A truck 11 has a cab 12 with a bed 13. A pair of bins 14 are enclosed by a body 15 having recessed corners 16 as best seen in FIG. 3 of the drawings.

Lifting posts 17 are of an I-beam configuration and are positioned one within each of the recessed corners 16. A plurality of post guides 18 and 18A being generally L-shaped are secured to the body 15 in vertically spaced relation to one another adjacent the recessed corners 16 as will best be seen in FIGS. 1 and 2 of the drawings.

A pair of secondary support and stabilizing braces 19 are mounted on each side of the body 15, each of which is comprised of a pair of elongated bars 20 and 21 pivotally secured to one another to form a generally X-shaped configuration. Sliding guides 22 are pivotally mounted on one of the ends of the bars 20 and 21 and engage in a pair of tracks 23 secured to the body 15. Skid plates 24 are pivotally secured to the other ends of the bars 20 and 21.

Figure 4:
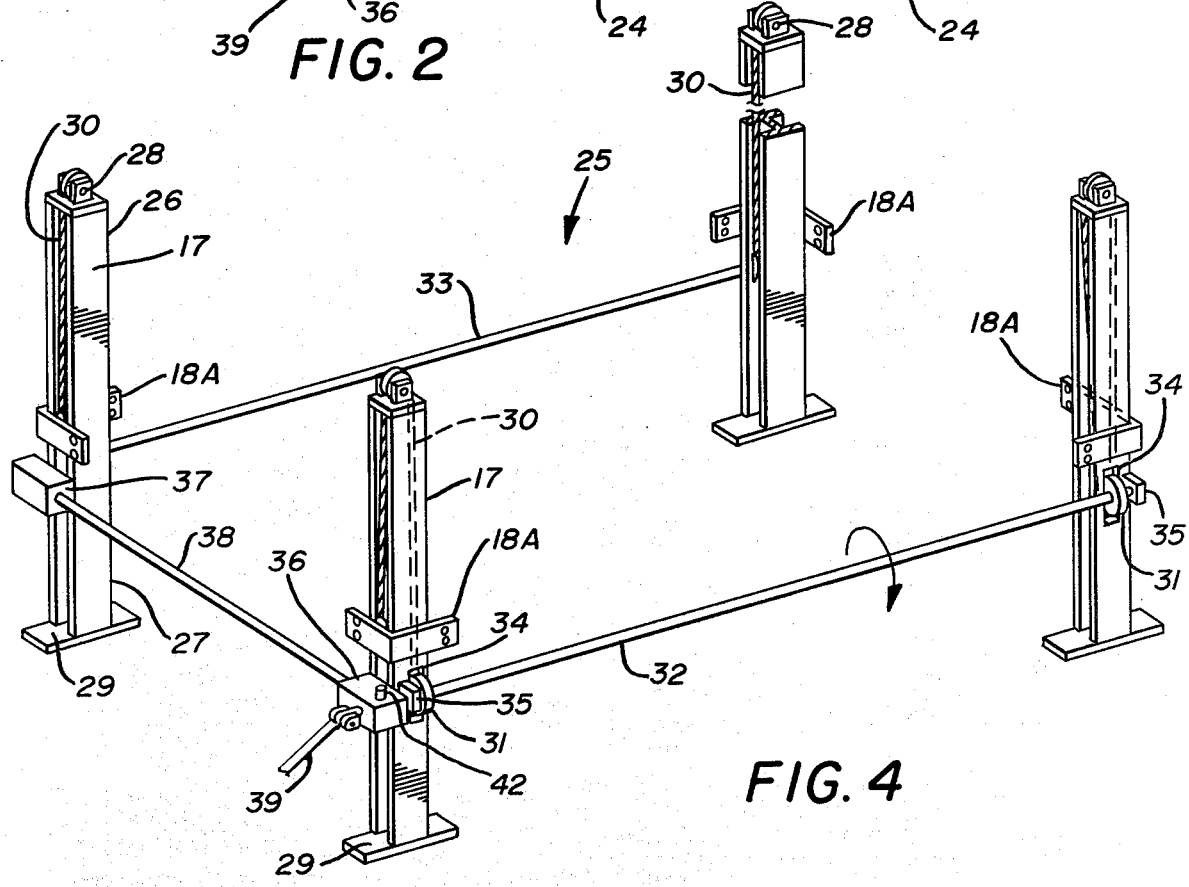
FIG. 4 is a perspective view showing the post and cable system with elements broken away.

Referring now to FIG. 4 of the drawings, the lifting apparatus is generally indicated by 25 comprising four posts 17, each of which has a top 26 and a bottom 27. A pulley assembly 28 is mounted on each of the tops 26 and support plates 29 are secured to the bottom 27 of each of the posts 17. Each of the posts 17 has a cable 30 that is secured to the post guides 18A and extend up and over the pulley assembly 28 and down to take-up reels 31 positioned on a pair of shafts 32 and 33. The reels 31 extend through an apertured area 34 in the posts 17 about a third of the way from the bottom 27. The shafts 32 and 33 run between the posts 17 and are secured at each end by journal fittings 35. A pair of gear boxes 36 and 37 are positioned on the posts 17 so as to engage the ends of the shaft 32 and 33. A drive shaft 38 extends between the gear boxes 36 and 37 with the gear box 36 having a main drive shaft 39 that connects with a power take-off, not shown, on the truck 11.

In operation the power take-off, now shown, on the truck 11 drives the main drive shaft 39 which is the input to the gear box 36 and output shafts 32 and 38 are driven thereby uniformly as will be understood by those skilled in the art. The shaft 38 in turn drives the gear box 37 mounted on one of the posts 17 whose output drives the shaft 33 at the same rpm as the shaft 32. The end portions of the cable 30 are unwound from the reel 31 allowing the posts 17 to move downwardly under their own weight and engage the ground with the support plate 29. The ends of the cables 30 are secured to the reels 31 so as the shafts 32 and 33 continue to turn the cables 30 are wound up in the opposite direction over the pulley assembly 28 to the post guides 18A secured to the bottom 15 lifting the body 15 above the truck bed 13 as seen in FIGS. 1 and 2 of the drawings.

As the body 15 and bins 14 are raised, the secondary support braces 19 are pulled upwardly with the sliding guides 22 moving towards one another on the tracks 23 while the skid blades 24 move towards one another and engage the ground. Pairs of spring loaded locking pins 40 on the sliding guides 22 engage registering apertures 41 in the tracks 23 locking the support braces 19 in an open elevated position when the body 15 and bins 14 reach the maximum height. A gear locking pin 42, as seen in FIG. 4 of the drawings, locks the shafts and their respective reels in place once the body 15 and bins 14 have been elevated. The main drive shaft 39 is disconnected from the power take-off of the truck 11 allowing the truck 11 to be driven away leaving the elevated body 15 and bins 14 in a stable and locked position. Once the bins 14 have been emptied, the truck 11 is positioned under the body 15 and the reverse of the steps outlined above are followed thereby repositioning the body 15 and bins 14 on the truck bed 13.

Although but one embodiment of the present invention has been illustrated and described, it will be apparent to those skilled in the art that various changes and modifications may be made therein without departing from the spirit of the invention and having thus described my invention, what I claim is:

1. A portable container having at least one bin therein, means for elevating said container relative to a supporting surface, said container having four right angular vertical walls joined by inwardly extending right angular corner configurations defining vertical paths, said means for elevating said container comprising four posts, each having a cross sectionally I-beam configuration, said posts disposed in said inwardly extending corner configurations, L-shaped post guides on said vertical walls partially enclosing said inwardly extending corner configurations to that said posts may move vertically on said paths, horizontally disposed rotatable shafts extending between said posts, pulleys on said posts and cables attached to said post guides and trained over said pulleys and engaged on said shafts, means for rotating said shafts simultaneously so as to move said cables and said container and said posts relative to one another.

2. The portable container of claim 1 and wherein journals are mounted on said posts and said shafts are rotatably positioned therein.

3. The portable container of claim 1 and wherein the posts are spaced with respect to one another so that a vehicle can be driven therebetween and inunder said container when the container is elevated on said posts.

4. The portable container of claim 1 and wherein the means for rotating said shafts simultaneously comprises a gear box and a drive shaft on said gear box is arranged for connection with a power take-off on a vehicle.

* * * * *